United States Patent [19]
Wittkowsky et al.

[11] Patent Number: 5,799,920
[45] Date of Patent: Sep. 1, 1998

[54] DEVICE FOR THE LONGITUDINAL ADJUSTMENT OF A MOTOR VEHICLE SEAT

[75] Inventors: Uwe Wittkowsky, Bad Muenstereifel; Ralf E. Porath, Solingen; Jochen Scheidler, Remscheid, all of Germany

[73] Assignee: Keiper Recaro GmbH & Co., Remscheid, Germany

[21] Appl. No.: 682,001

[22] Filed: Jul. 16, 1996

[30] Foreign Application Priority Data

Jul. 19, 1995 [DE] Germany ............... 195 26 317.0
Apr. 4, 1996 [DE] Germany ............... 196 13 432.3

[51] Int. Cl.$^6$ .......................................... B60N 2/08
[52] U.S. Cl. .............................. 248/429; 297/344.11
[58] Field of Search ........................ 248/429, 424; 296/63, 65.1; 297/340, 341, 316, 312, 311, 344.1, 344.11

[56] References Cited

U.S. PATENT DOCUMENTS

| | | | |
|---|---|---|---|
| 4,580,755 | 4/1986 | Rees | 248/424 X |
| 4,648,657 | 3/1987 | Cox et al. | 297/341 |
| 4,671,571 | 6/1987 | Gionet | 248/429 X |
| 4,781,354 | 11/1988 | Nihei et al. | 248/424 X |
| 5,076,529 | 12/1991 | Dove et al. | 296/65.1 X |
| 5,242,144 | 9/1993 | Williams et al. | 248/429 |
| 5,273,241 | 12/1993 | Droulon | 248/429 |
| 5,275,370 | 1/1994 | Terai | 296/65.1 X |
| 5,286,076 | 2/1994 | DeVoss et al. | 296/65.1 |
| 5,567,013 | 10/1996 | Chang | 297/344.1 X |
| 5,597,206 | 1/1997 | Ainsworth et al. | 297/344.1 X |

FOREIGN PATENT DOCUMENTS

| | | | |
|---|---|---|---|
| 3442159 | 5/1986 | Germany | 248/429 |
| 44 19 335 | 12/1995 | Germany | |
| 241223 | 10/1986 | Japan | 248/429 |
| 2128472 | 5/1984 | United Kingdom | 297/311 |

*Primary Examiner*—Michael Safavi
*Attorney, Agent, or Firm*—McAulay Fisher Nissen Goldberg & Kiel, LLP

[57] ABSTRACT

A seat part is supported at the upper rails of rail arrangements which are arranged at both longitudinal sides of the seat and which comprise, in addition to an upper rail, a lower rail which receives the upper rail in a longitudinally displaceable manner. A locking device which can be disengaged from a row of teeth of each lower rail for the purpose of longitudinal displacement of the seat is arranged at the upper rails. The locking device has a release device which is coupled with toothed arms at swivelably supported locking levers, which toothed arms are spring-loaded in the locking direction. The release device has a two-part release lever formed of a swivelably supported actuating lever and a grip bar or actuating stirrup. In order to prevent cancellation of the connection position between the locking lever supported at the upper rail and the row of teeth of the lower rail even when the release device is unintentionally actuated as the result of a collision by application of pressure to the grip bar or actuating stirrup in the rearward direction, the grip bar or the actuating stirrup is arranged so as to be displaceable longitudinally against the force of a spring element which positions the grip bar or actuating stirrup in the forward initial position and can be deflected to the rear when loaded by pressure acting toward the rear in the longitudinal direction of the seat.

14 Claims, 9 Drawing Sheets

DEVICE FOR THE LONGITUDINAL ADJUSTMENT OF A MOTOR VEHICLE SEAT

BACKGROUND OF THE INVENTION a) Field of the Invention

The invention is directed to a device for the longitudinal adjustment of a motor vehicle seat whose seat part is supported at upper rails of rail arrangements which are arranged on both longitudinal sides of the seat and which comprise, in addition to an upper rail, a lower rail which receives the upper rail in a longitudinally displaceable manner. A locking device which can be disengaged from a row of teeth of the lower rails for the purpose of longitudinal displacement is arranged at the upper rails. This locking device has a release device which is coupled with toothed arms of locking levers, which toothed arms are spring-loaded in the locking direction. This release device has a two-part release lever formed of a swivelably supported actuating lever and a grip bar or actuating stirrup.

b) Description of the Related Art

DE 44 19 335 A1 shows a device of the type mentioned above in which each of the lower rails of rail arrangements arranged on both longitudinal sides of the seat has a row of teeth at a projecting leg. The teeth of a locking lever can engage in the spaces between the teeth in this row of teeth. This locking lever is articulated in a rotatable manner with the respective upper rail by means of a fulcrum. A release device is coupled with these locking levers. The release device is substantially formed of an actuating stirrup which extends in front of the seat cushion, functions as a handle and has connection arms at both sides. The fulcrum of the locking levers which forms a swivel axis is identical to the swivelling points of the connection arms of the actuating stirrup. The toothed arms of the locking levers are loaded by a spring in the direction of engagement in the rows of teeth of the lower rails so as to fix the adjusted use position of the seat. Since the actuating stirrup extends in front of the front edge of the seat so as to be exposed, this actuating stirrup can be actuated unintentionally by the lower leg of the occupant of the seat in the event of a collision such that the longitudinal side of the seat is unlocked. The seat which then moves due to the force of inertia can cause serious injury to the occupant of the seat.

OBJECT AND SUMMARY OF THE INVENTION

The primary object of the present invention is to improve a device of the type indicated above in such a way that the connection position between the locking lever supported at the upper rail and the row of teeth of the lower rail cannot be disengaged even when the release device is unintentionally actuated as the result of a collision. This object is met in a device of this type in that the grip bar or the actuating stirrup is arranged so as to be displaceable longitudinally against the force of a spring element which positions the grip bar or actuating stirrup in the forward initial position and can be deflected to the rear when loaded by pressure acting toward the rear in the longitudinal direction of the seat. Since the grip bar or actuating stirrup can be deflected counter to the driving direction under the application of pressure, the locking engagement between the upper rail and lower rail is not canceled, so that the locking position between the upper rail and the lower rail can only be disengaged by a defined and deliberate actuation of the grip bar or actuating stirrup by means of lifting without application of pressure in the longitudinal direction of the seat.

For this purpose, the grip bar or actuating stirrup could be sprung so as to be exclusively axially displaceable, although this would require a relatively substantial amount of free space in order to carry out the deflecting movement so that the handle of the grip bar would have to be arranged in the region below the seat, which reduces convenience of operation.

A satisfactory arrangement of the grip bar as regards operating convenience is achieved in that the grip bar engages in a fork-shaped connection head of the actuating lever and, by means of at least two pins which are secured thereto at a distance from one another in each leg of the correction head, also engages through at least two successively arranged elongated holes, the front elongated holes having a recess which extends upward at the rear end. In this solution, the grip bar is not only displaced toward the rear, but is also swiveled up without resulting in a disengagement of the locking position. Since a swiveling movement is superposed on the displacing movement, the displacement path can be relatively small because a sufficient deflecting movement is achieved by means of the additional swiveling.

An advantageous construction of the subject matter of the invention is achieved in that the spring element is formed of a tension spring which is fitted to the front end of the connection head of the actuating lever and to the rear end of the grip bar.

In order to make do with a grip bar on only one longitudinal side of the motor vehicle seat, the actuating lever which is coupled with the grip bar on one longitudinal side of the seat has a driver eye which receives a transmission rod which is fixed with respect to rotation relative to it, this transmission rod being connected in turn with an actuating lever on the other longitudinal side of the seat so as to be fixed with respect to rotation relative to it.

According to an advantageous design feature of the invention, in order that the grip bar can be comfortably reached by the occupant of the seat so as to increase convenience of operation and so that unlocking can be easily carried out for adjusting the length of the seat, a handle is connected to the grip bar at its front end which is bent up at an angle of approximately 45°, this handle also being bent up by an angle of approximately 45° relative to the front end of the grip bar. The handle is accordingly located in front of the front side of the seat and can be conveniently reached.

In a second embodiment form of the invention, the release device comprises a driver plate which is swivelable about the swivel axis of the locking lever, which swivel axis forms an axial center. The driver plate, which forms an actuating lever, is connected with the locking lever so as to be displaceable longitudinally and has a locking protuberance which can be secured at the upper rail in order to lock the locking lever in its engaged position with the teeth when the driver plate is displaced toward the driving direction. For this purpose, the driver plates which are arranged on each longitudinal side of the seat are connected with one another via an actuating stirrup which is connected in a stationary manner to the driver plates. When the actuating stirrup is released under normal conditions, the driver plates and the locking levers connected therewith are also swiveled via this actuating stirrup so that their toothed arms swivel out of their locked position with the row of teeth of the lower rail and the upper rail carrying the seat part can be displaced relative to the lower rail. On the other hand, if the actuating lever and the driver plates connected therewith are pushed toward the rear opposite to the driving direction by the application of pressure, the locking protuberances of the driver plate slide over a laterally projecting housing leg of the upper rail and contact the upper side of the housing leg so that a swiveling movement of the locking lever is prevented in the pushed back position of the driver plates as a result of their locking protuberances in conjunction with the housing leg of the upper rail.

For the purpose of connecting the driver plates with the locking levers so as to allow displacement in the longitudinal direction in the case of a torque-transmitting connection between these two structural component parts, the driver plate advantageously has at least two elongated holes which are arranged one after the other at a distance from one another in the longitudinal direction, projections of the locking lever engaging in the elongated holes for longitudinal guidance of the driver plate.

In order to ensure the swiveling movement of the locking levers and the driver plates which are connected therewith so as to be displaceable longitudinally and, on the other hand, to keep the driver plates in their pushed forward position, each locking lever is supported by a stamped out eye in a bore hole of a side cheek which is connected in a stationary manner with the upper rail. The locking lever has a guide finger which engages behind the side cheek in order to secure its position axially. A pin is fixed in the eye of the locking lever. The pin penetrates an elongated hole of the driver plate. At its shaft portion which projects out over the driver plate, the pin forms an abutment for a spring element acting upon the driver plate in the driving direction. For this purpose, the driver plate has an angular bend at its rear end for connecting the other end of the spring element which is designed as a tension spring and which is connected by one end to the shaft part of the pin.

Instead of a direct articulation of the tension spring at the pin of the locking lever, an axial retainer which secures the axial position of the driver plate may be placed on the shaft part of the pin projecting beyond the driver plate. This axial holder can be outfitted with a retaining tongue for receiving a spring sleeve of the tension spring holding the driver plate with the actuating stirrup in the ready position for locking.

The connection of the actuating stirrup with the driver plates on the longitudinal sides of the seat can be carried out in different ways. One possibility consists in that the driver plate is advantageously provided with an upwardly projecting connection tab with which the actuating stirrup is connected in a stationary manner, e.g., by welding. Another possibility consists in that each driver plate passes into a christmas tree-shaped tongue at its front side, the actuating stirrup being secured to this christmas tree-shaped tongue with the intermediary of a sleeve by means of a stamped in groove.

The invention is shown in embodiment examples in the drawing and is explained more fully in the following.

DESCRIPTION OF THE PREFERRED EMBODIMENTS

Figure 1:
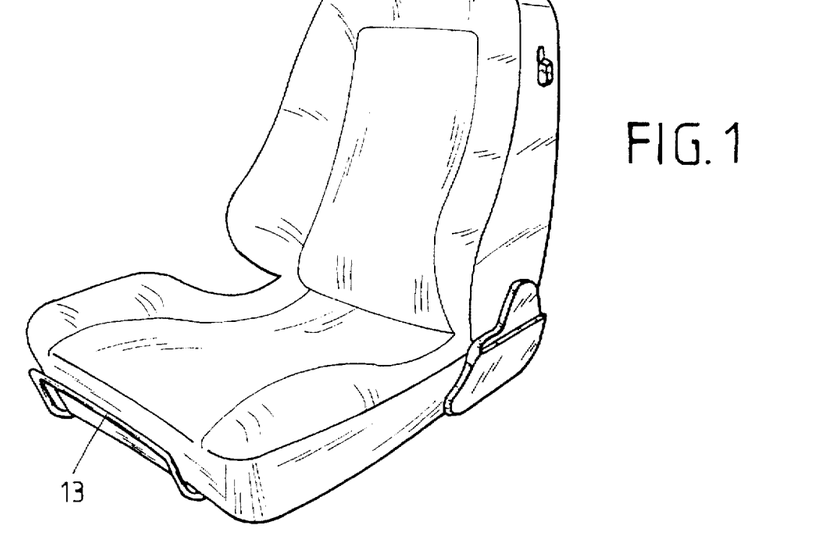
FIG. 1 shows a perspective view of a motor vehicle seat in which an actuating stirrup projects in front of the front side of the seat.

In the motor vehicle seat shown in FIG. 1, an actuating stirrup for canceling the locking position between the upper rail supporting the seat part and the lower rail of a rail arrangement, not shown, which lower rail is stationary with respect to the vehicle, is located in front of the front side of the motor vehicle seat. The actuating stirrup can be actuated along the entire width of the seat.

Figure 2:
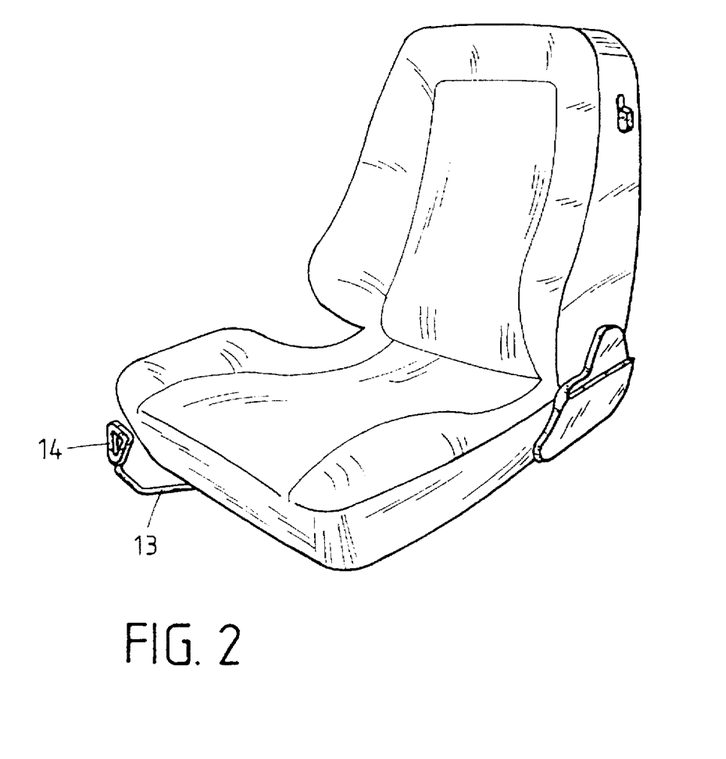
FIG. 2 shows a perspective view of a motor vehicle seat in which a grip bar projects in front of the front side of the seat on only one longitudinal side of the seat.

FIG. 2 shows a seat in which the grip bar 13 of a release lever belonging to the release device is located in front of the front side of the seat on one longitudinal side. This grip bar has a handle 14 at its free end. In the present instance, there is only one actuating location at a front side of a seat, the foot region remaining open.

Figure 3:
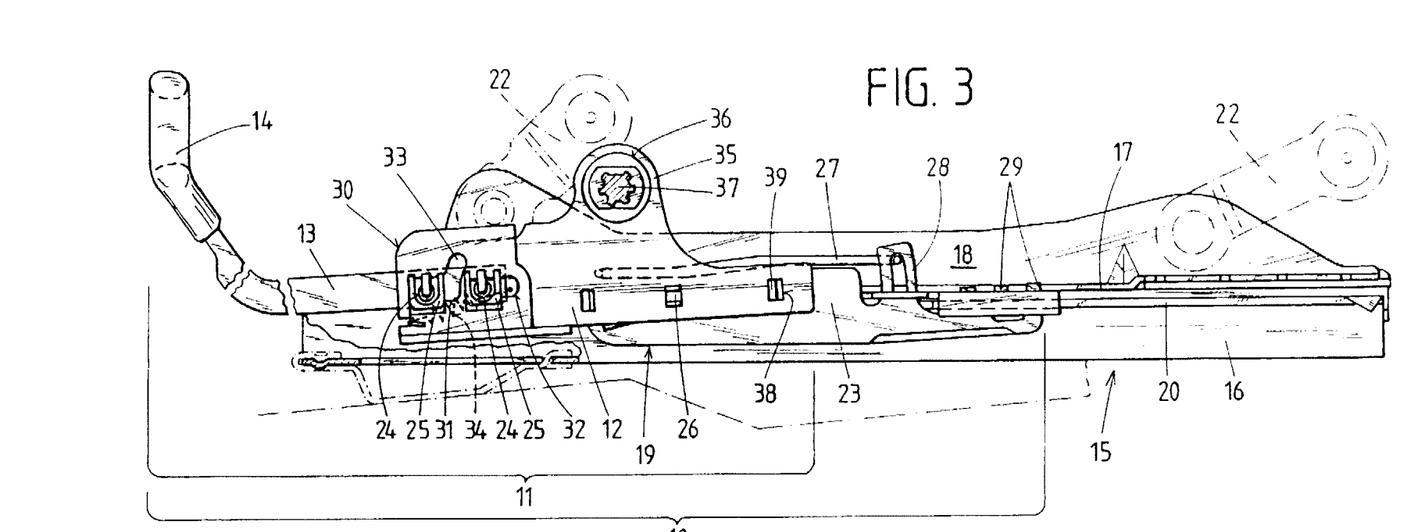
FIG. 3 is a side view, as seen from the inner side of the seat, showing the device with a grip bar for the longitudinal adjustment of a motor vehicle seat comprising a rail arrangement in which the upper rail is in a locking position with the lower rail.
Figure 4:
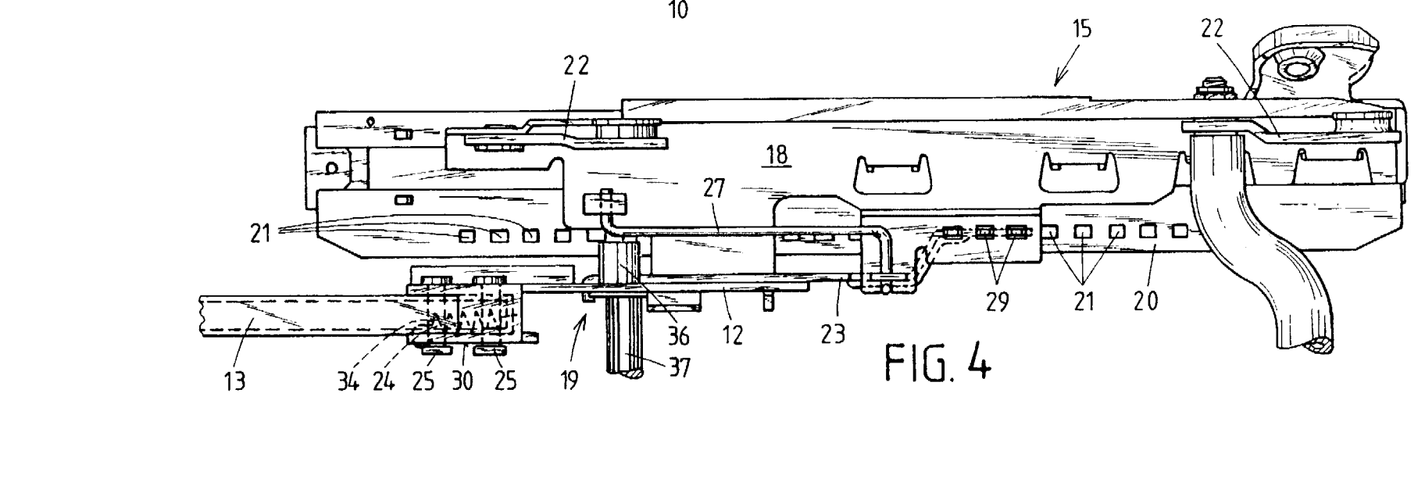
FIG. 4 is a top view showing the rail arrangement, according to FIG. 3, outfitted with the release device.
Figure 5:
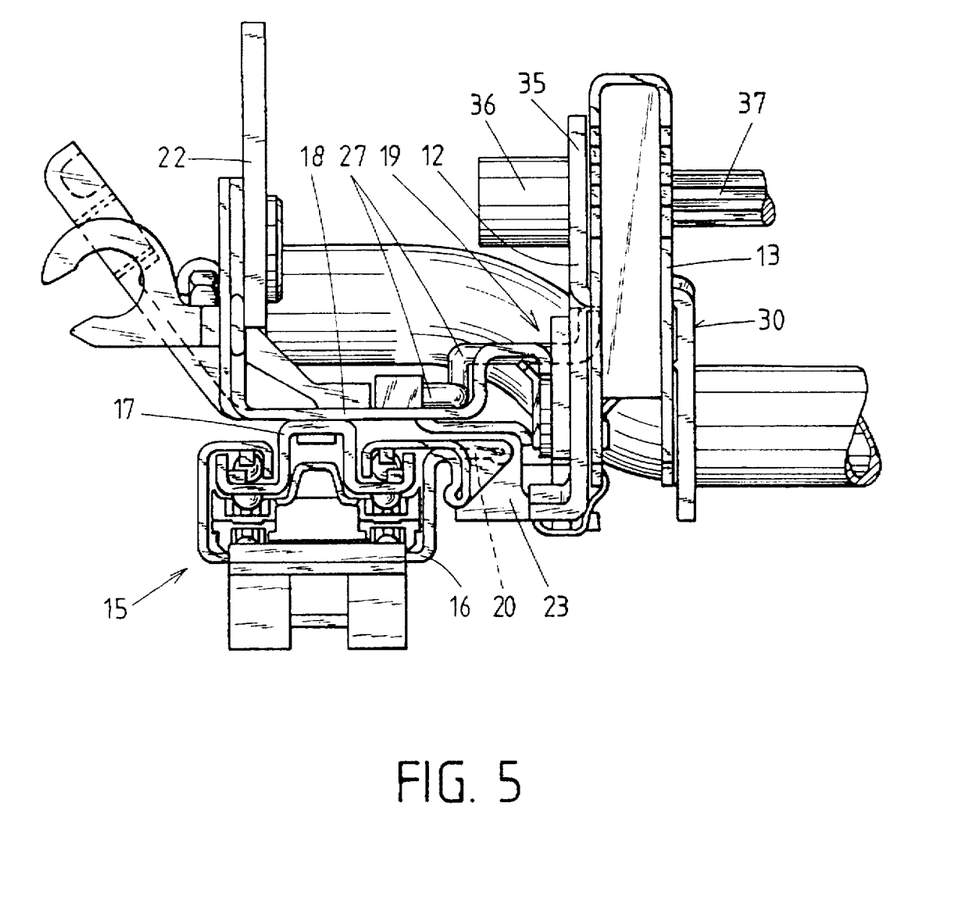
FIG. 5 shows a front view of the release device connected with a rail arrangement according to FIGS. 3 and 4.

The rail arrangement 15 shown in FIGS. 3 to 5 has a lower rail 16 with a substantially C-shaped cross section and an upper rail 17 with a roughly hat-shaped cross section which is guided in the lower rail 16 so as to be displaceable longitudinally in a known manner via sliding bodies or rolling bodies. A supporting rail 18 which carries a locking device 19 is fastened to the upper rail 17. The lower rail 16 has a horizontal flange 20 which faces the inner side of the seat and in which holes 21 are spaced at equal distances in the longitudinal direction of the rails so as jointly to form a row of teeth. Swivel levers 22 are articulated at the supporting rail 18 and are connected in a rotatably articulated manner with a seat support, not shown, for vertical adjustment of the seat support. The locking device 19 which is formed on each longitudinal side of the seat by a locking lever 23 and an actuating lever 12 and 12' corrected therewith is supported at the supporting rail 18. Actuating lever 12 is preferably arranged only on the inner longitudinal side of the seat, while actuating lever 12' can be arranged on the outer longitudinal side of the seat. The actuating levers are connected, via recesses 38, with projections 39 of the locking lever 23 and are swivelable jointly about an axial center 26 which is secured to the supporting rail 18 and which forms a swivel axis. Further, a spring bar 27 is secured by one end to the supporting rail 18, its other end engaging through a hook eyelet 28 of the locking lever 23 penetrating the supporting rail 18 at the top. The spring bar 27 acts upon the locking lever 23 in a springing manner such that the teeth 29 of the locking lever 23 penetrate the holes 21 of the row of teeth in the flange 20 of the lower rail 16 in the locking position. In this embodiment form, a fork-shaped connection head 30 is formed integral with the front end of the actuating lever 12, this connection head 30 being formed by a sheet-metal tab which is bent into a U-shape. The rear end of a grip bar 13 which has a U-shaped profile in cross section engages between the legs of the connection head 30. By means of two pins arranged at a distance from one another and formed by head bolts 24, the grip bar 13 engages in two horizontal elongated holes 31 and 32 of identical length which are arranged in each leg of the connection head 30. The rear end of every front elongated hole 31 has a recess 33 which extends upward and which is constructed as a slot which is curved around the rear center of the respective rear elongated hole 32. The head bolts 24 which penetrate both the grip bar 13 and the elongated holes 31 and 32 in the connection head 30 and which form pins are secured in the axial direction by retaining plates 25 on the side opposite to their head.

Figure 6:
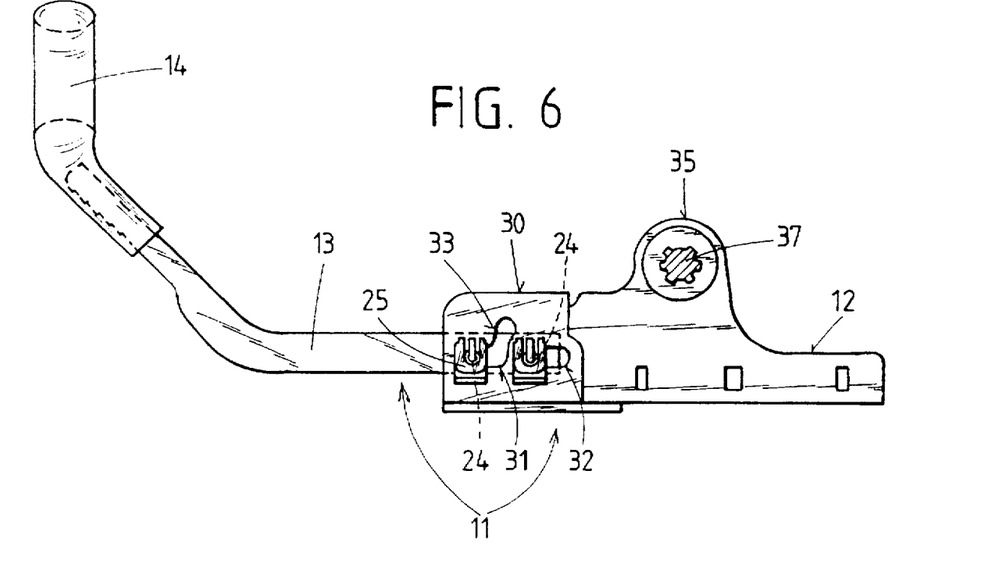
FIG. 6 shows a side view of the release device in which the grip bar is in its normal position.
Figure 7:
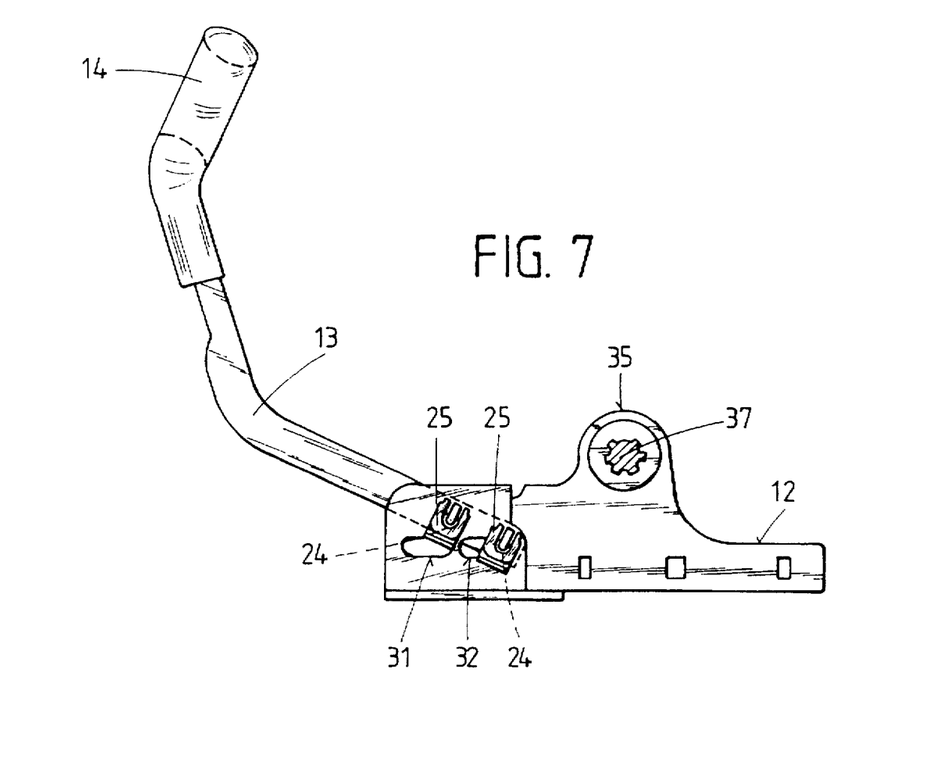
FIG. 7 shows the release device, according to FIG. 6, in which the grip bar is located in its deflected position due to unintentional actuation.

In the position shown most clearly in FIGS. 3 and 6, the grip bar 13 is supported by a spring element 34. In the present embodiment example, this spring element is formed of a tension spring 34, one end of which is fitted in a recess at the front side of a leg of the connection head 30, while its other end acts on the rear end of the grip bar 13.

The front region of the grip bar 13 is bent up at an angle of approximately 45°, a handle 14 being connected at the free end of the bend. This handle 14 has an eyelet-shaped handle part which is also bent up at approximately 45° relative to the shaft of this handle 14.

Figure 8:
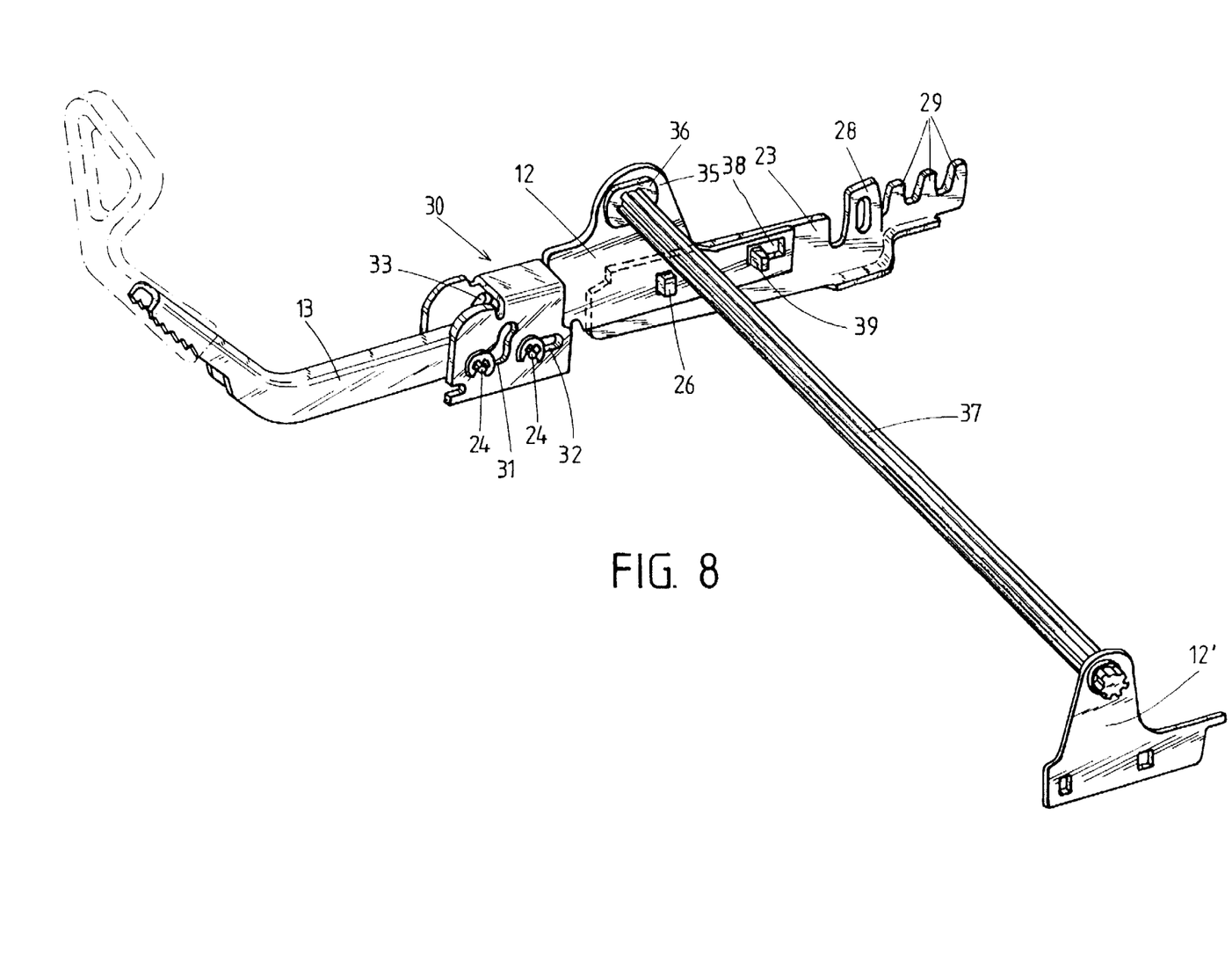
FIG. 8 shows the release device in a perspective view showing the transmitting structural component parts for canceling the locking position on the opposite longitudinal side of the seat.

The actuating lever 12 of one longitudinal side of the seat has a driver eye 35 which is connected in a stationary manner with a bushing 36 having a profiled bore hole. A profiled transmission rod 37 engages in this bushing 36 so as to be fixed against rotation and is, in turn, connected with the actuating lever 12' on the opposite longitudinal side of the seat by its other end, likewise so as to be fixed against rotation (FIG. 8).

Together with the grip bar 13, the actuating lever 12 forms a release lever 11 which is swivelable about the axial center 26 and communicates with the locking lever 23 in the manner described above. In conjunction with the locking lever 23, the lever 11 forms the release device 10 which also includes the transmission rod 37 and actuating lever 12'.

In the connection position in which the upper rail 17 is locked relative to the lower rail 16, the release lever 11 occupies the position shown in FIGS. 3 and 6. When the upper rail 17 is displaced relative to the lower rail 16 to adjust the longitudinal position of the seat, the entire release lever 11 is swiveled in the clockwise direction about the axial center 26 by raising the handle 14, since the pins 24 of the grip bar 13 are located in the front end of the elongated holes 31 and 32, so that the grip bar 13 with the actuating lever 12 forms a rigid unit. When the release lever 11 carries out a swiveling movement in the clockwise direction, the locking lever 23 which is likewise swivelable about the axial center 26 is also swiveled in the clockwise direction against the restoring force of the spring bar 27 due to its connection with the release lever 11 so that the teeth 29 swivel out of the row of teeth 21 in the flange 20 of the lower rail 16. In this position of the release device 10, the upper rail 17 can be displaced relative to the lower rail 16 so that the seat which is secured to the upper rail can occupy the desired longitudinal position. After letting go of the handle 14, the release device 10 is swiveled back in the counterclockwise direction as a result of the action of the spring bar 27 so that the teeth 29 once again engage in the holes 21 of the row of teeth as soon as the teeth 29 associated with the upper rail 17 arrive in a position where they coincide with the holes 21 of the row of teeth in the leg 20 of the lower rail.

However, should an unintentional operation be brought about in that the occupant of the seat hits the handle with the lower leg or the heel of the shoe, regardless of whether or not this happens during a collision, the grip bar 13 is pushed backward, wherein the pins 24 which are fixed in this grip bar 13 move back in the elongated holes 31 and 32 against the force of the tension spring 34 until the pins 24 abut against the rear side of the elongated hole 32 The grip bar 13 is then swiveled up, since the front pins 24 of the grip bar 13 penetrate into the recess 33 which is constructed as a curved slot. The tension spring 34 serves to hold the grip bar 13 in the initial position, i.e., in the position for intentional actuation of the longitudinal locking of the rail arrangement. After an inappropriate or unintentional actuation the tension spring 34 returns the grip bar 13 to the initial position mentioned above. Thus, when the grip bar 13 is unintentionally loaded toward the rear, there takes place a deflecting movement of this grip bar 13 together with its handle 14 without bringing about a release of the locking lever 23 which remains in its locking position shown in FIGS. 3 and 4.

As was already mentioned, in the motor vehicle seat shown in FIG. 1 there is located in front of the front side of the seat an actuating stirrup 13 for canceling the locking position between the upper rail supporting the seat part and the lower rail which is fixed with respect to the vehicle in a rail arrangement, not shown in FIG. 1. The actuating stirrup 13 travels over approximately the entire width of the vehicle seat.

Figure 9:
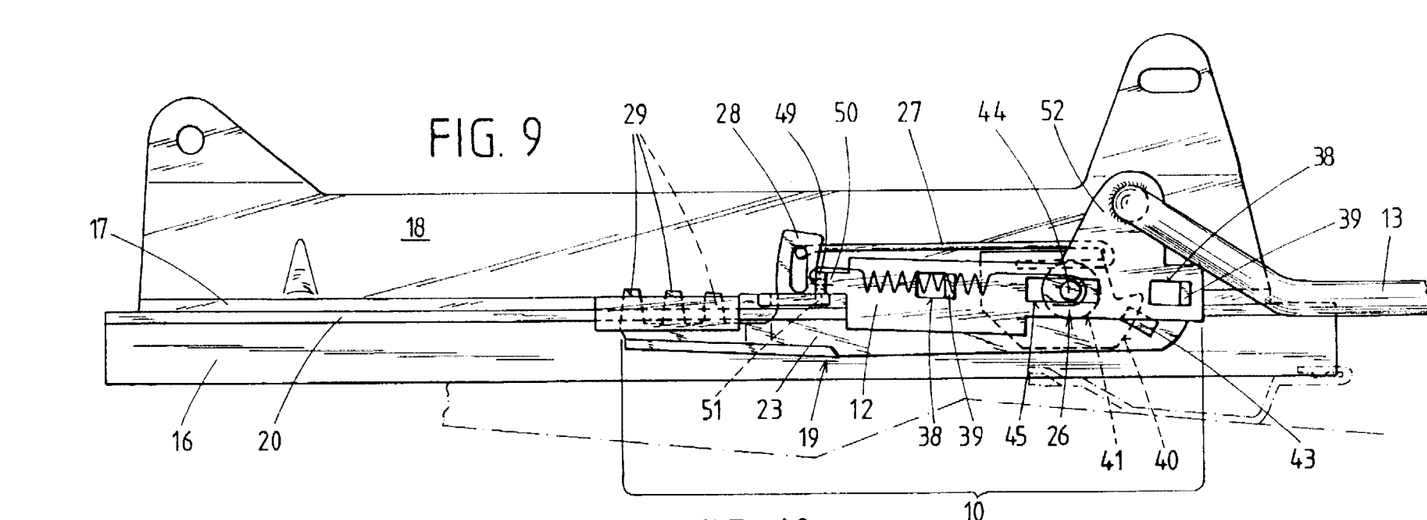
FIG. 9 is a side view, as seen from the inner side of the seat, showing another embodiment example of a device which can be manipulated by means of an actuating stirrup for the longitudinal adjustment of a motor vehicle seat with a rail arrangement in which the upper rail is located in a locking position with the lower rail.
Figure 10:
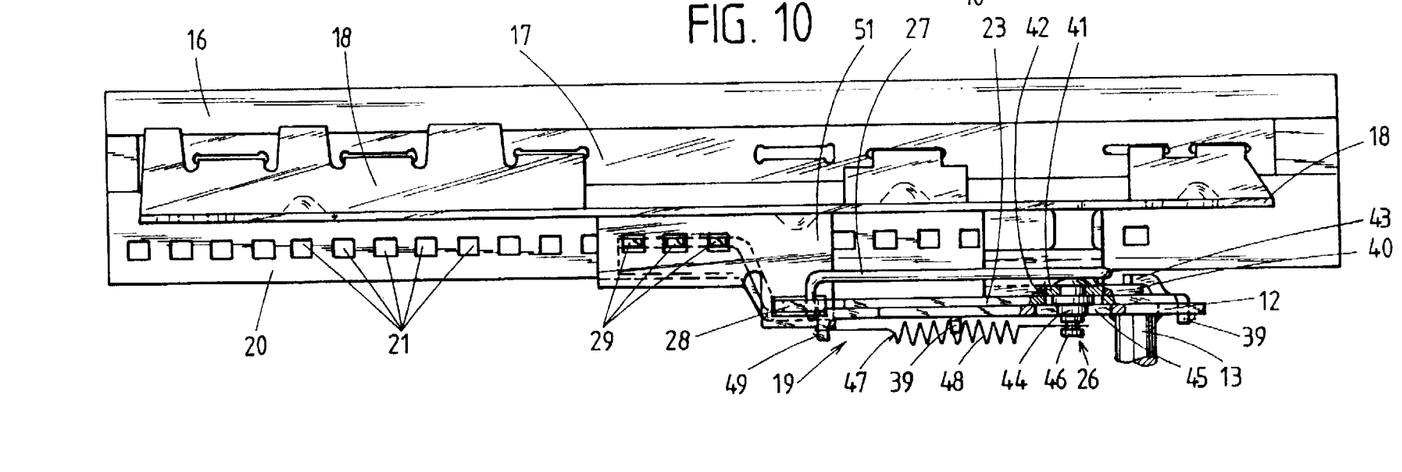
FIG. 10 shows a top view of the rail arrangement according to FIG. 9 which is outfitted with the release device.
Figure 11:
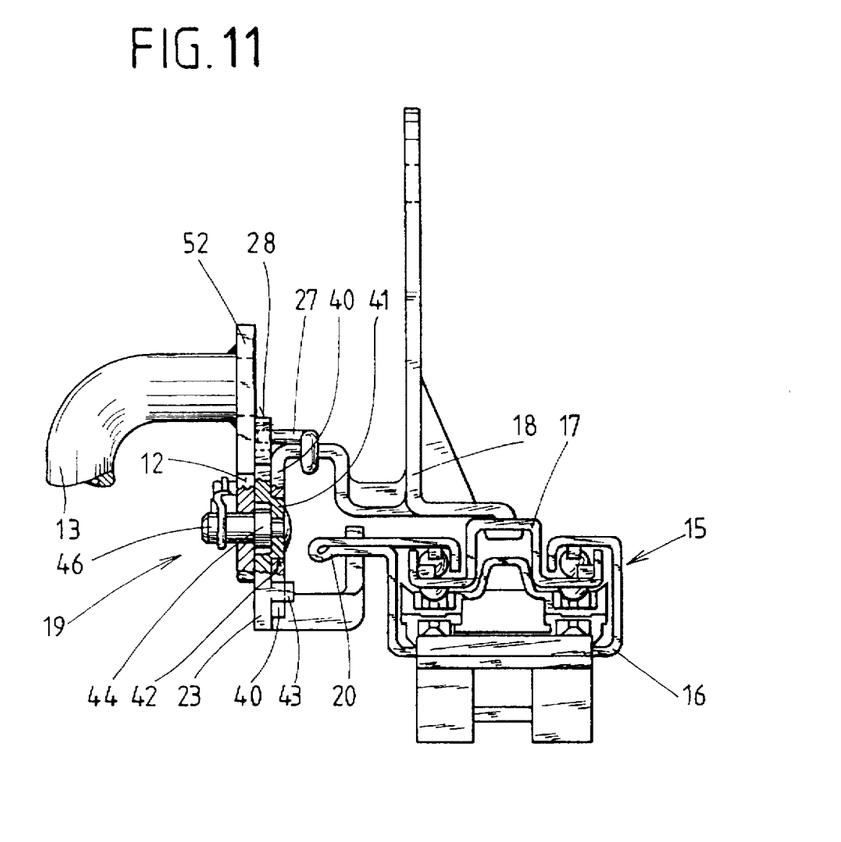
FIG. 11 shows a front view of the rail arrangement shown in FIGS. 9 and 10 with the release device connected to the upper rail.

In the embodiment example shown in FIGS. 9 to 11, the rail arrangement 15 also has a lower rail 16 with a substantially C-shaped cross section and an upper rail 17 with a roughly hat-shaped cross section which is guided in the lower rail 16 so as to be displaceable longitudinally in a known manner via sliding bodies or rolling bodies. In the present case, also, a supporting rail 18 which carries a locking device 19 is fastened at the upper rail 17. The lower rail 16 has a horizontal flange 20 which faces the inner side of the seat and in which elongated holes 21 are spaced at equal distances in the longitudinal direction of the rails so as jointly to form a row of teeth.

Again, in a known manner not shown herein, swivel levers can be articulated at the supporting rail 18, these swivel levers being, connected in a rotatably articulated manner with a seat support, not shown, for vertical adjustment of the seat support. On the other hand, the locking device 19 which is formed on each longitudinal side of the seat by a locking lever 23 and a driver plate 12 connected therewith is supported at the supporting rail 18. This driver plate is arranged on the inner longitudinal side of the seat and is connected, via at least two elongated holes 38, with projections 37 of the locking lever 23 so as to be longitudinally displaceable and is swivelable, together with the locking lever 23, about an axial center 26 which is fixed at the side cheek 40 of the supporting rail 18. In the present embodiment form, this axial center 26 which forms a swivel axis is the center of an eye 41 which is stamped out of the locking lever 23 and is supported in a bore hole 42 in the side cheek 40 of the supporting rail 18 which is connected in a stationary manner with the upper rail 17. Further, a spring bar 27 is secured by one end to the supporting rail 18, while its other end engages in a hook eyelet 28 of the locking lever 23 penetrating the supporting rail 18 at the top. The spring bar 27 acts upon the locking lever 23 in a springing manner such that the teeth 29 of the locking lever 23 penetrate the holes 21 of the row of teeth in the flange 20 of the lower rail 16 in the locking position.

While the rotatably articulated connection of the locking lever 23 with the side cheek 40 of the supporting rail 18 is effected via the eye 41 of the locking lever 23, this eye 41 being supported in the bore hole 42, the position of the locking lever 23 is secured axially relative to the side cheek 40 by means of a guide finger 43 which engages behind this side cheek in the assembled state. A pin 44 forming the axial center 26 and penetrating an elongated hole 45 of the driver plate 12 is secured in the center of the eye 41 of the locking lever 23. At its shaft part 46 which projects out beyond the driver plate 12, the pin 44 forms an abutment for a spring element 47 of known construction such as a resilient pad, gas pressure spring or the like, although this spring element 47 is designed as a tension spring 48 in the embodiment examples shown in the drawings. While one end of this tension spring 48 is fastened to the shaft part 46 of the pin 44 as was shown above, the other end of the tension spring 47 is connected to a bend 49 at the driver plate 12, this bend 49 forming a component part of a locking protuberance 50 which is formed integral with the driver plate 12.

Figure 12:
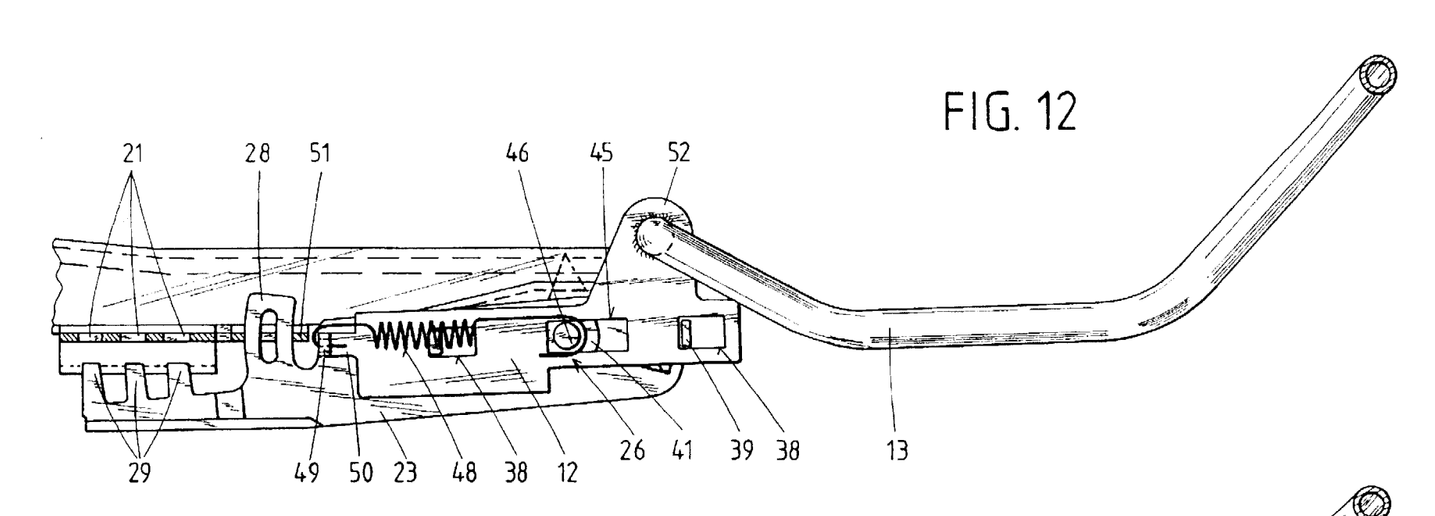
FIG. 12 shows the front region of the release device shown in FIGS. 9 to 11 whose locking lever is in a releasing position.
Figure 13:
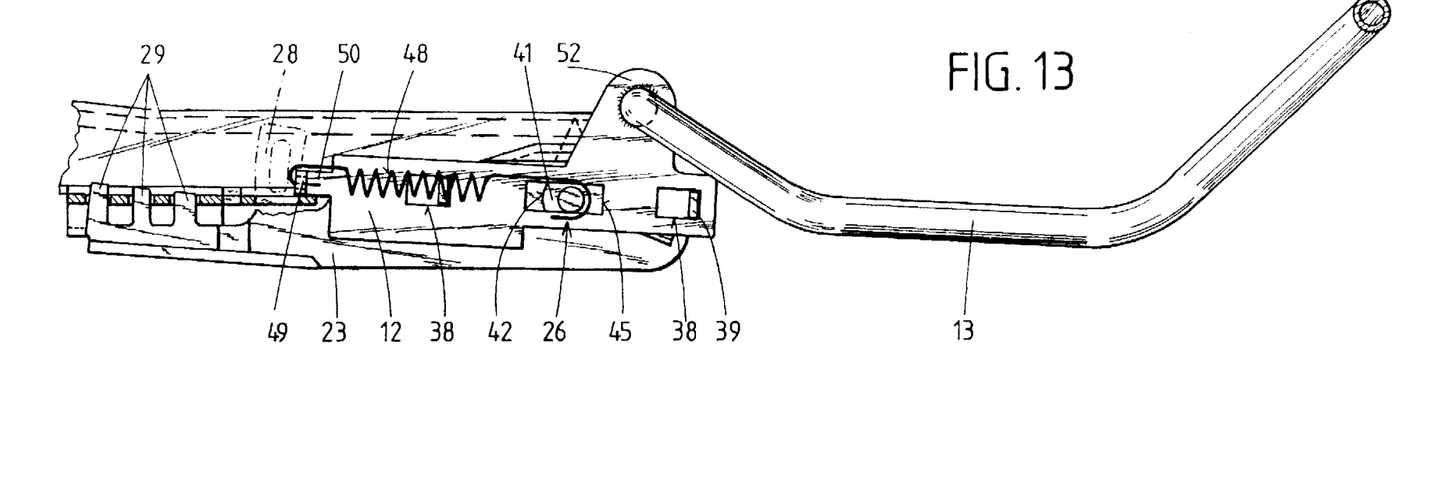
FIG. 13 shows the release device according to FIG. 12 in a locked position in which the release device is secured against swiveling of its locking lever by means of sliding back the driver plate.

Under normal circumstances, the driver plate 12 is pushed forward into the position shown in FIG. 12 due to the action of the tension spring 48 so that the locking protuberance 50, with its bend 49, can be swiveled freely past a connection wall 51 between the supporting rail 18 and the side cheek 40 as is shown in FIG. 12. However, when the driver plate 12 is pushed back by means of applying pressure to the actuating stirrup 13 in the locking position of the locking lever 23 shown in FIGS. 9 to 11 and 13, the locking protuberance 50, including its bend 49, is located directly above the connection wall 51 so that the locking lever 23 in this state is prevented from swiveling out of the connection position in that it is locked by the driver plate 12 at the connection wall 51. It is only when the actuating stirrup 13 is no longer subjected to any force components acting toward the rear that the tension spring 48 is capable of displacing the driver plate 12 toward the front so as to enable a swiveling of the driver plate 12 and the locking lever 23 connected therewith, as will be seen from fig. 12.

Figure 14:
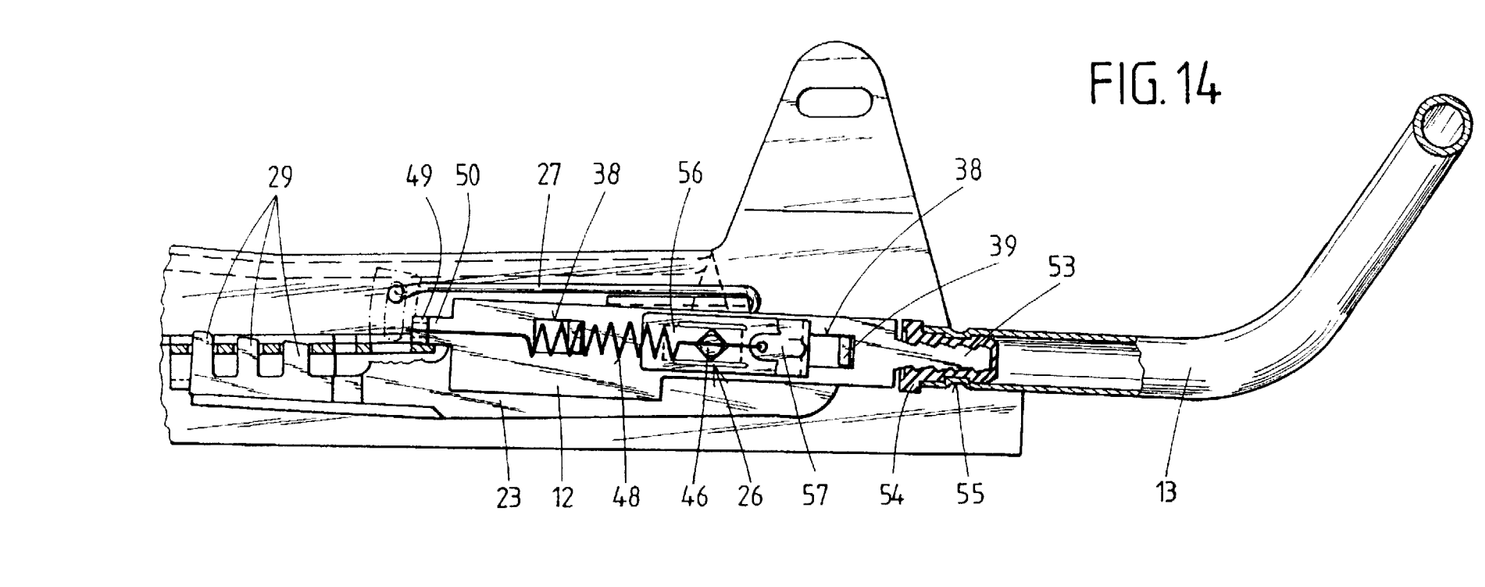
FIG. 14 shows another embodiment example of a release device in a view similar to FIG. 13.
Figure 15:
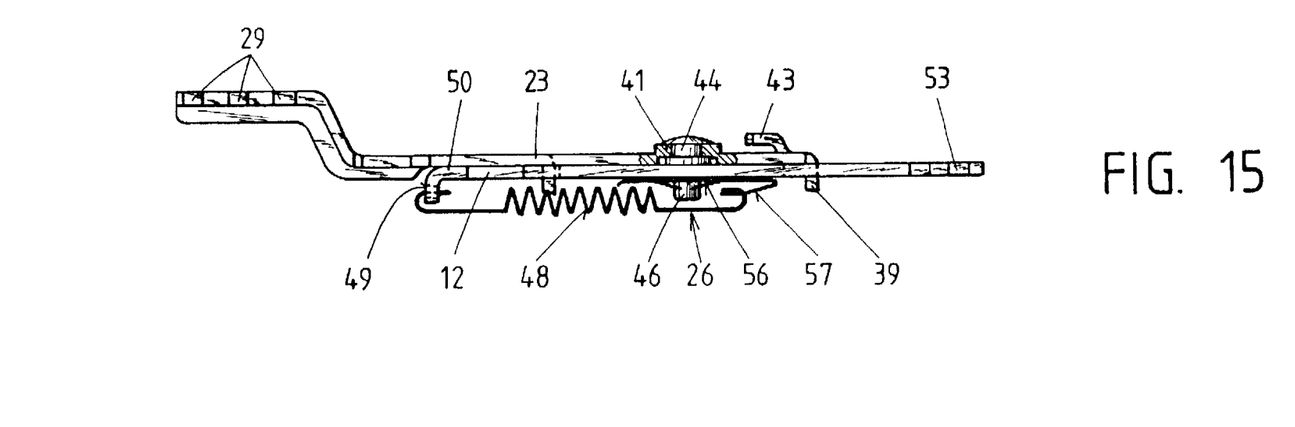
FIG. 15 is a top view showing only the structural component parts of the release device according to FIG. 14 with the driver plate in a pushed out locking position.

In the embodiment example shown in FIGS. 9 to 13, the driver plate 12 has, in its front region, a connection tab 52 which projects upward, the free leg of the actuating stirrup 13 being connected to this connection tab 52, e.g., by welding, on both longitudinal sides of the seat. However, instead of the connection tab 52, a christmas tree-shaped tongue 53 can be formed integral with the front side of the driver plate in accordance with the illustration shown in FIGS. 14 and 15, a sleeve 54 being slipped over this christmas tree-shaped tongue 53 and the free leg of a tubular actuating stirrup 13 being placed over this sleeve 54 and secured to the christmas tree-shaped tongue 53 by means of a stamped groove 55 over the sleeve 54.

In the embodiment example shown in FIGS. 9 to 13, one end of the tension spring 48 is fitted directly to the shaft part 46 of the pin 44 projecting beyond the driver plate 12. However, in the embodiment example shown in FIGS. 14 and 15, an axial retainer 56 is placed on the shaft part 46 projecting beyond the driver plate 12 in order to fix the driver plate 12 axially, this axial retainer 56 gripping the shaft part 46 with resilient tongue regions. This axial retainer 56 also has a retaining tongue 57 to which is fitted one end of the tension spring 58, the other end of the tension spring 58 being fitted to the bend 49 of the locking protuberance 50 of the driver plate 12 as in the embodiment examples shown above.

As was already mentioned, the embodiments shown in the drawing and described above are only examples of the subject matter of the invention which is in no way limited thereto. Moreover, all of the features indicated in the drawing and in the description are substantial to the invention, even when not expressly claimed in the patent claims.

| Reference numbers: | |
|---|---|
| 10 | release device |
| 11 | release lever |
| 12' | actuating lever/driver plate |
| 12 | actuating lever |
| 13 | grip bar/actuating stirrup |
| 14 | handle |
| 15 | rail arrangement |
| 16 | lower rail |
| 17 | upper rail |
| 18 | supporting rail |
| 19 | locking device |
| 20 | flange at 16 |
| 21 | hole/row of teeth |
| 22 | swivel lever |
| 23 | locking lever |
| 24 | head bolt/pin |
| 25 | retaining plate |
| 26 | axial center/swivel axis |
| 27 | spring bar |
| 28 | hook eyelet at 23 |
| 29 | tooth at 23 |
| 30 | connection head of 12 |
| 31 | elongated hole |
| 32 | elongated hole |
| 33 | recess/slot |
| 34 | spring element/tension spring |
| 35 | driver eye |
| 36 | bushing |
| 37 | transmission rod |
| 38 | elongated hole in 12 |
| 39 | projection at 23 |
| 40 | side cheek |
| 41 | eye |
| 42 | bore hole |
| 43 | guide finger |
| 44 | pin |
| 45 | elongated hole in 12 |
| 46 | shaft part of 44 |
| 47 | spring element |
| 48 | tension spring |
| 49 | bend |
| 50 | locking protuberance |
| 51 | connection wall |
| 52 | connection tab |
| 53 | christmastree-shaped tongue |
| 54 | sleeve |

| Reference numbers: |  |
| --- | --- |
| 55 | groove |
| 56 | axial retainer |
| 57 | retaining tongue |

What is claim is:

1. In a device for the longitudinal adjustment of a motor vehicle seat whose seat part is supported at the upper rails of rail arrangements which are arranged on both longitudinal sides of the seat and which comprise, in addition to an upper rail, a lower rail which receives the upper rail in a longitudinally displaceable manner, wherein a locking device which can be disengaged from a row of teeth of the lower rails for the purpose of longitudinal displacement is arranged at the upper rails, said locking device having a release device which is coupled with toothed arms of locking levers, which toothed arms are spring-loaded in the locking direction, said release device having a two-part release lever formed of a swivelably supported actuating lever and a grip bar or actuating stirrup, the improvement comprising that the grip bar or actuating stirrup is arranged so as to be displaceable longitudinally relative to the locking levers against the force of a spring element which positions the grip bar or actuating stirrup in the forward initial position and can be deflected to the rear when loaded by pressure acting toward the rear in the longitudinal direction of the seat, to prevent rotation of the locking levers and disengagement thereof from the teeth of the lower rails.

2. The device according to claim 1, wherein the grip bar engages in a fork-shaped connection head of the actuating lever and, by at least two pins which are arranged at the latter at a distance from one another in each leg of the connection head, also engages through at least two successively arranged elongated holes, the front elongated holes having a recess which extends upward at their rear end.

3. The device according to claim 2, wherein the recess which extends upward at the rear end of the front elongated holes of the connection head is formed as a slot which is curved around the rear center of the rear elongated holes.

4. The device according to claim 2, wherein the spring element is formed of a tension spring which is fitted to the front end of the connection head of the actuating lever and to the rear end of the grip bar.

5. The device according to claim 1, wherein the actuating lever which is coupled with the grip bar on one longitudinal side of the seat has a driver eye which receives a transmission rod which is fixed with respect to rotation relative to it, said transmission rod being connected in turn with an actuating lever on the other longitudinal side of the seat so as to be fixed with respect to rotation relative to it.

6. The device according to claim 1, wherein a handle is connected to the grip bar at its front end which is bent up at an angle of approximately 45°, said handle also being bent up by an angle of approximately 45° relative to the front end of the grip bar.

7. The device according to claim 1, wherein the release device comprises a driver plate which is swivelable together with the locking lever about the swivel axis of the locking lever, which swivel axis forms an axial center, said driver plate, which forms an actuating lever and is connected in such manner with the locking lever so as to be displaceable longitudinally, having a locking protuberance which can be secured at the upper rail in order to lock the locking lever in its engaged position with the teeth when the driver plate is displaced against the driving direction of the vehicle.

8. The device according to claim 7, wherein the driver plates which are arranged on each longitudinal side of the seat are connected with one another via an actuating stirrup which is connected in a stationary manner to the driver plates.

9. The device according to claim 7, wherein the driver plate has at least two elongated holes which are arranged one after the other at a distance from one another in the longitudinal direction, projections of the locking lever engaging in the elongated holes for the purpose of longitudinal guidance of the driver plate.

10. The device according to claim 7, wherein the locking lever is supported by a stamped out eye in a bore hole of a side cheek which is connected in a stationary manner with the upper rail, and the locking lever has a guide finger which engages behind the side cheek in order to secure its position axially, whereas a pin is fixed in the eye of the locking lever, said pin penetrating an elongated hole of the driver plate and forming, at its shaft portion which projects out over the driver plate, an abutment for a spring element acting upon the driver plate in the driving direction.

11. The device according to claim 10, wherein the driver plate has an angular bend at its rear end for connecting the other end of the spring element which is constructed as a tension spring and is connected by one end to the shaft part of the pin.

12. The device according to claim 7, wherein a shaft part of a pin projecting beyond the driver plate has an axial retainer which secures the axial position of the driver plate and which has a retaining tongue for receiving a spring eyelet of the tension spring holding the driver plate with the actuating stirrup in the ready position for locking.

13. The device according to claim 7, wherein the driver plate has an upwardly projecting connection tab for connecting with the actuating stirrup in a stationary manner.

14. The device according to claim 7, wherein the driver plate passes into a christmas tree-shaped tongue at its front side, said actuating stirrup being secured to said christmas tree-shaped tongue, when appropriate, with the intermediary of a sleeve by means of a stamped in groove.

* * * * *